(12) United States Patent
Gaia et al.

(10) Patent No.: US 9,726,047 B2
(45) Date of Patent: Aug. 8, 2017

(54) METHOD AND TURBINE FOR EXPANDING AN ORGANIC OPERATING FLUID IN A RANKINE CYCLE

(71) Applicant: TURBODEN S.r.l., Brescia (IT)

(72) Inventors: Mario Gaia, Brescia (IT); Roberto Bini, Brescia (IT)

(73) Assignee: TURBODEN S.R.L., Brescia (BS) (IT)

( * ) Notice: Subject to any disclaimer, the term of this patent is extended or adjusted under 35 U.S.C. 154(b) by 406 days.

(21) Appl. No.: 14/373,325

(22) PCT Filed: Dec. 18, 2012

(86) PCT No.: PCT/IB2012/057410
§ 371 (c)(1),
(2) Date: Jul. 18, 2014

(87) PCT Pub. No.: WO2013/108099
PCT Pub. Date: Jul. 25, 2013

(65) Prior Publication Data
US 2014/0363268 A1 Dec. 11, 2014

(30) Foreign Application Priority Data
Jan. 20, 2012 (IT) .............................. BS2012A0008

(51) Int. Cl.
*F01K 7/16* (2006.01)
*F01K 7/02* (2006.01)
(Continued)

(52) U.S. Cl.
CPC ................. *F01K 7/16* (2013.01); *F01D 1/04* (2013.01); *F01D 1/06* (2013.01); *F01D 1/12* (2013.01); *F01K 7/02* (2013.01); *F01K 25/10* (2013.01)

(58) Field of Classification Search
CPC ... F01K 7/02; F01K 7/16; F01K 25/10; F01D 1/04; F01D 1/06; F01D 1/12; F01D 1/14;
(Continued)

(56) References Cited

U.S. PATENT DOCUMENTS 3,462,953 A * 8/1969 Wilde ....................... F01D 1/22
415/62
4,435,121 A * 3/1984 Wosika ..................... F01D 1/34
415/198.1
(Continued)

FOREIGN PATENT DOCUMENTS

DE 554163 C 7/1932
WO 2006048401 A1 5/2006

*Primary Examiner* — Gregory Anderson
*Assistant Examiner* — Alexander White
(74) *Attorney, Agent, or Firm* — Volpe and Koenig, P.C.

(57) ABSTRACT

A method and a turbine for expanding an organic operating fluid in a Rankine cycle includes the step of feeding the operating fluid to a turbine provided with a plurality of arrays of stator blades alternating with a plurality of arrays of rotor blades, to define corresponding turbine stages, constrained to a shaft which rotates on the respective rotation axis. The method also includes: a) causing a first expansion of the operating fluid in one or more radial stages of the turbine, b) diverting the operating fluid exiting from the radial stages in a direction axial and tangential with respect to the rotation axis, and c) causing a second fluid expansion in one or more axial stages of the turbine. Step b) corresponds to an enthalpy change of the operating fluid equal to at least 50% of the average enthalpy change provided for completing the fluid expansion in the turbine.

16 Claims, 3 Drawing Sheets

(51) Int. Cl.
*F01D 1/04* (2006.01)
*F01D 1/06* (2006.01)
*F01K 25/10* (2006.01)
*F01D 1/12* (2006.01)

(58) Field of Classification Search
CPC . F01D 3/02; F01D 3/025; F01D 5/041; F01D 5/043; F01D 5/048; F05D 2210/42; F05D 2210/43; F05D 2210/44
See application file for complete search history.

(56) References Cited

U.S. PATENT DOCUMENTS

| | | | | |
|---|---|---|---|---|
| 5,241,815 | A * | 9/1993 | Lee et al. | F02C 3/045 415/79 |
| 6,647,707 | B2 * | 11/2003 | Dev | F02C 3/045 415/68 |
| 2008/0252077 | A1 | 10/2008 | Myers | |
| 2010/0166559 | A1 * | 7/2010 | Ahaus et al. | F01D 5/066 416/198 A |
| 2011/0085887 | A1 | 4/2011 | Mokulys et al. | |
| 2012/0027568 | A1 * | 2/2012 | Haller | F01D 1/04 415/1 |
| 2013/0118169 | A1 * | 5/2013 | Milam et al. | F01K 25/08 60/651 |

* cited by examiner

METHOD AND TURBINE FOR EXPANDING AN ORGANIC OPERATING FLUID IN A RANKINE CYCLE

FIELD OF THE INVENTION

The present invention refers to a method for expanding an organic operating fluid in a Rankine cycle and a turbine which allows to implement such a method. The present application claims the priority of Italian patent application n. BS2012A000008 filed on 20 Dec. 2011.

STATE OF THE ART

With the acronym ORC "Organic Rankine Cycle" thermodynamic cycles of Rankine type are usually identified, which are used in corresponding plants for the production of electrical power starting from thermal power using an organic operating fluid with high molecular mass.

For example, ORC plants are used for the combined production of electrical and thermal power starting from solid biomass; alternatively waste heats of industrial processes, heat recovery from prime movers or geothermal heat sources are used.

For example an ORC plant fed with biomass usually comprises:
- a combustion chamber fed with fuel biomass;
- a heat exchanger provided to give part of the heat of combustion fumes/gases to a heat-transfer fluid, such as a diathermic oil, delivered by an intermediate circuit;
- a heat exchanger provided to give part of the heat of the intermediate heat-transfer fluid to an operating fluid to be evaporated;
- a turbine fed with an operating fluid in the vapor state; and
- an electric generator activated by the turbine for the production of electrical power.

In the combustion chamber the heat-transfer fluid, for example diathermic oil, is heated up to a temperature usually equal to about 300° C. The heat-transfer fluid circulates in a closed loop, passing through the afore mentioned heat exchanger in which the organic operating fluid evaporates. The vapor of the operating fluid expands in the turbine, producing mechanic power, then transformed into electrical power by the generator connected to the shaft of the turbine itself. As the respective expansion in the turbine will end, the vapor of the operating fluid condenses in an appropriate condenser, giving heat to a cooling fluid, usually water, used downstream of the plant as thermal carrier at about 80° C.-90° C., for example for the district heating. The operating fluid is fed to the heat exchanger crossed by the heat-transfer fluid, completing the cycle in closed loop.

The produced electrical power can be used to activate auxiliary devices of the plant and/or it can be introduced into a power distribution network.

In ORC plants characterized by a high expansion ratio and a high enthalpy change of the operating fluid in the turbine, the latter is provided with three or more stages, where with the term stage the assembly of an array of stator blades and the corresponding array of rotor blades is meant.

As the number of turbine stages increases over a certain limit, the use of two turbines connected in series will be convenient for the activation of a single generator. Therefore, instead of increasing the number of stages in a single turbine, for example up to six stages or more, two turbines are adopted, both with three stages.

For example, in a plant designed by the Applicant for the production of 5 MW, instead of using a single axial turbine with six stages, intended to rotate at 3.000 rpm, two axial turbines are used, one at high pressure and the other at low pressure, connected with the respective shaft to a single generator, at opposite sides with respect to the latter.

Solutions with several turbines, as the one afore described, have more than one drawback of technical and economical kind. The plant must be provided with a number of reducers for coupling the turbines to the generator, valves for inflowing vapor into the low pressure turbine in addition to the high pressure intake valves, an insulated duct for the fluidic connection between turbines, double bearings, etc. This entails an increase of production costs, as well as technical difficulties for starting, stopping and operating the plant.

The US patent application 2008/0252077 describes a turbine for applications in ORC plants (par. 11). The turbine is of centripetal radial type, with a single stage, therefore the expansion of the operating fluid substantially happens through the axis of the turbine itself; the exhaust substantially happens in the axial direction.

In fields different from what afore described, gas turbines provided with radial stages alternating with axial stages have been proposed.

For example, the U.S. Pat. No. 3,462,953 describes a gas turbine for aeronautical applications, therefore not operating according to a Rankine cycle, comprising an array of rotor blades interposed among the first radial stages entering into the turbine and the axial stages exiting from the turbine. These rotor blades are arranged to divert the gas from a radial expansion direction to an axial expansion direction.

Documents U.S. Pat. No. 4,435,121, WO 2006/048401, DE 554163 and US 2011/085887 are descriptive of the state of the art.

Object and Summary of the Invention

It is an object of the present invention to provide a turbine and a method for expanding an organic operating fluid in a Rankine cycle allowing to solve the drawbacks of known solutions.

The present invention, in a first aspect thereof, relates therefore to a method according to claim 1.

In particular the present invention refers to a method for expanding an organic operating fluid in a Rankine cycle, comprising the step of feeding the operating fluid to a non-centripetal turbine provided with a plurality of stages, each defined by an array of stator blades alternating with an array of rotor blades constrained to a shaft which rotates on the respective rotation axis. Advantageously the method comprises the further steps of:
a) inducing a first expansion of the operating fluid through one or more radial stages,
b) diverting the operating fluid in a blade array, named angular blades, from the substantially radial initial expansion direction to an expansion direction substantially axial and tangential (with respect to an observer integral with said angular blades), and
c) providing a second fluid expansion through one or more axial stages.

Step b) corresponds to an enthalpy change of the operating fluid equal to at least 50% of the average enthalpy change provided for completing the fluid expansion in the whole turbine.

With the term average enthalpy change the ratio between the total enthalpy change of the whole stages and the number of stages in which the expansion is carried out, is intended. The total enthalpy change of the whole stages corresponds to the difference between the total enthalpy of the operating fluid downstream of the whole stages and the total enthalpy of the fluid upstream of the whole stages.

In the scope of the present invention it is referred, as usual frequently in the turbine field, to an axially symmetrical coordinate system in which a generic plane, on which the rotation axis of the turbine shaft lies, is called meridian plane. The direction orthogonal to the machine axis and lying on the considered meridian plane is named radial direction. With the term tangential direction in a point of a meridian plane the direction orthogonal to the meridian plane and orthogonal to the radial direction passing through the point, is identified. A direction parallel to the machine axis is defined axial direction.

More in detail, an axial stage comprises an array of stator blades and a corresponding array of rotor blades, respectively upstream and downstream of the mass flow direction; in its turn the flow happens mainly thanks to the axial speed component inside the flow.

An axial stage comprises an array of stator blades and a corresponding array of rotor blades, respectively upstream and downstream of the mass flow direction; in its turn the flow happens mainly thanks to the radial speed component inside the flow.

By realizing a first expansion with radial stages and a second expansion with axial stages excellent results are obtained in terms of efficiency for the same conditions, without having necessarily to provide for two turbines but, on the contrary, using a single radial-axial turbine.

In particular, the method allows to avoid the use of a high pressure axial turbine and a low pressure axial turbine. The first high pressure expansion happens radially with centrifugal flow, in corresponding radial stages of the turbine, and the second low pressure expansion happens axially, in corresponding axial stages of the same turbine.

Obviously the method provides that the fluid is diverted between the two expansions from the initial radial expansion direction to the final axial expansion direction.

Angular blades are stator blades or, alternatively, rotor blades.

Steps a)-c) are carried out in a single radial-axial turbine. Preferably step a) is carried out by carrying the operating fluid through at least one array of stator blades and one corresponding array of rotor blades disposed alternated one another in the radial direction. Step c) is carried out by carrying the operating fluid through at least one array of stator blades and one corresponding array of rotor blades disposed alternated one another in the axial direction. Step b) is carried out carrying the fluid through an array of stator or rotor blades, named angular blades, followed or preceded by the corresponding rotor or stator blade array, respectively.

By carrying out the afore described method, the vapor of the operating fluid is expanded in a single turbine and, therefore, the installation of two turbines in cascade or the adoption of an axial turbine with a number of stages (for example more than three) are avoided, with obvious technical and economical advantages.

With respect to the solution described in U.S. Pat. No. 3,462,953, the present invention provides that angular blades are arranged to realize an enthalpy change of the operating fluid greater than, or equal to, 50% of the average enthalpy change of the whole expansion in turbine. In other words the angular blades described in U.S. Pat. No. 3,462, 953 have a marginal role in transforming the energy of the operating fluid; on the contrary in the present invention the angular blades are disposed to transform a significant and precisely quantified portion of the fluid energy as input to turbine shaft power. This corresponds to a tangential diversion that angular blades impart to operating fluid.

In a method embodiment, the angular blades of the turbine are stator blades; the flow of expanding vapor is diverted in axial direction and tangential direction, that is in the array of angular blades and, for an observer integral with the latter, the radial component of speed vector of the flow of operating fluid is minimized and the axial component and the tangential component of the same speed vector are maximized.

In an alternative method embodiment, angular blades are rotor blades and between steps b) and c) an additional step d) of inverting the direction way of the vapor expansion downstream of the array of angular blades is carried out. In other terms, the fluid passing through the array of angular rotor blades is diverted in a substantially axial direction, but counterflow with respect to the crossing direction of axial stages of the turbine. More in detail, the array of rotor angular blades produces an effect on the flow of operating fluid minimizing or eliminating the radial component of the respective speed vector and increasing the axial component and the tangential component of the same speed vector in the relative motion, that is for an observer integral with the angular blades. In the absolute motion, that is for a stationary observer, the speed vector of the operating fluid exiting from the array of angular blades is substantially axial, that is the tangential component of the speed vector in the absolute motion is more or less null because it is balanced by the tangential speed of the same angular blades (conventionally named with the term cranking speed).

Therefore the fluid downstream of the angular rotor blades is further diverted of about 180°, to be properly directed towards the axial stages and the exit of the turbine. The inversion is obtained preferably by providing the turbine with a substantially toroidal duct connecting the outlet section of the angular blades to the inlet section of the array of immediately downstream stator blades; in the axial section the duct extends according to a U-shaped curve.

In its second aspect the present invention concerns a turbine according to claim 6 for the expansion of an organic operating fluid in a Rankine cycle.

In particular the turbine comprises arrays of stator blades and arrays of rotor blades, alternated to the former, and a shift for supporting the rotor blades, which is rotating on the respective rotation axis. In a first section of the turbine, the arrays of stator blades and the arrays of rotor blades alternate in a substantially radial direction; in a second section of the turbine the arrays of stator blades and the arrays of rotor blades alternate in a substantially axial direction. Between the first and the second sections of the turbine there is at least one array of stator or rotor blades, named above angular blades, arranged to divert the operating fluid from an expansion direction substantially radial in the absolute motion to a direction substantially axial in the absolute motion and tangential in the absolute motion or the relative motion, depending on whether the angular blades are stator or rotor blades, respectively. In other words the angular blades are arranged to minimize or eliminate, for a stationary observer, the radial component of the speed vector of the operating fluid entering into the array, and to increase, for a stationary observer, the axial component of the speed vector of the fluid exiting from the array and to increase, for an observer integral with the angular blades, the tangential component too of the speed vector of the fluid exiting from the array.

The enthalpy change of the operating fluid expanded through the angular blades is equal to at least 50% of the average enthalpy change provided for completing the fluid expansion in the whole turbine.

Preferably the leading edge of the angular blades extends in a substantially axial direction, that is substantially parallel to the axis of the turbine shift, and the respective trailing edge extends in a substantially radial direction, that is substantially orthogonal to the axis of the turbine shift.

Preferably the angular blades extend in a substantially curved radial and axial direction. In other words the surface of each angular blade forces the vapor flow of operating fluid to change the expansion direction from radial to axial.

In the preferred embodiment the angular blades extend at least in part in the tangential direction in order to increase the tangential component of the speed vector of the operating fluid. In this way it is possible to accelerate the fluid during the flow diversion to efficiency advantage, thanks to the thickness reduction of the limit layer adjacent to flow guide surfaces.

In an embodiment the turbine comprises an axial intake manifold of the operating fluid arranged aligned with the shaft of the same turbine. In this case the angular blades are stator blades.

The diversion of operating fluid flow that the array of angular blades causes corresponds to an enthalpy decrease. The enthalpy change happening in the array of angular blades is caused mainly by a decrease of the fluid pressure between each adjacent angular blade, with respect to the pressure value upstream the array itself. Correspondingly almost a total conversion of pressure energy in kinetic energy happens, with minimal fluid dynamic losses.

In quantitative terms the array of angular blades can work at least half of the average enthalpy change (defined by the ratio between the total enthalpy change obtained in the turbine and the number of its stages) and, in the array of angular blades, at least 10% of the enthalpy change available for the array itself is transformed in kinetic energy of the operating fluid in relative motion.

Preferably in this embodiment the shaft is cantileverly supported by bearings provided around the shaft, at the opposite side with respect to the intake manifold.

In an alternative embodiment the turbine comprises a flow inversion volute. The angular blades are rotor blades and the volute defines a curve of about 180° between them and the array of immediately downstream stator blades, that is it defines the afore described substantially toroidal duct. In this way the inversion of the axial direction way of the vapor expansion of operating fluid is obtained.

In this latter described embodiment preferably the passage section or duct extending between the angular blades and said curve is at least partially increasing to obtain a slow-down of the operating fluid before the respective expansion direction is inverted. Downstream of, or along, said curve the volute can be provided with at least one inflow/extraction port of the operating fluid. An intake manifold of the operating fluid can be arranged radially with respect to the shaft, next to the respective supporting bearings.

Generally at least one array of rotor blades is assembled preferably on supporting disks coupled to corresponding flanges of the shaft with a Hirth toothing. This type of coupling has a self-centering effect of the supporting disks with respect to the shaft.

To avoid the shaft carrying the supporting disks from being subjected to undesired effects of axial thrusts, the turbine is provided with chambers, defined by corresponding inner volumes of the turbine, thanks to which a balance of pressures acting on the two faces of the disks themselves is determined.

In particular the chambers are provided upstream and downstream of each supporting disk. Particularly referring to the first supporting disk, the chambers provided at the same side with respect to such a disk are isolated one from another, for example by means of labyrinths; the chambers axially separated from the first supporting disk communicate through one or more through holes made in the disk itself. In addition, at least one chamber provided downstream the first supporting disk communicates with the high-pressure stages of the turbine provided upstream the first disk.

BRIEF DESCRIPTION OF THE DRAWINGS

Further details of the invention will be evident anyway from the following description course made with reference to the attached drawings, in which.

DETAILED DESCRIPTION OF THE INVENTION

Figure 1:
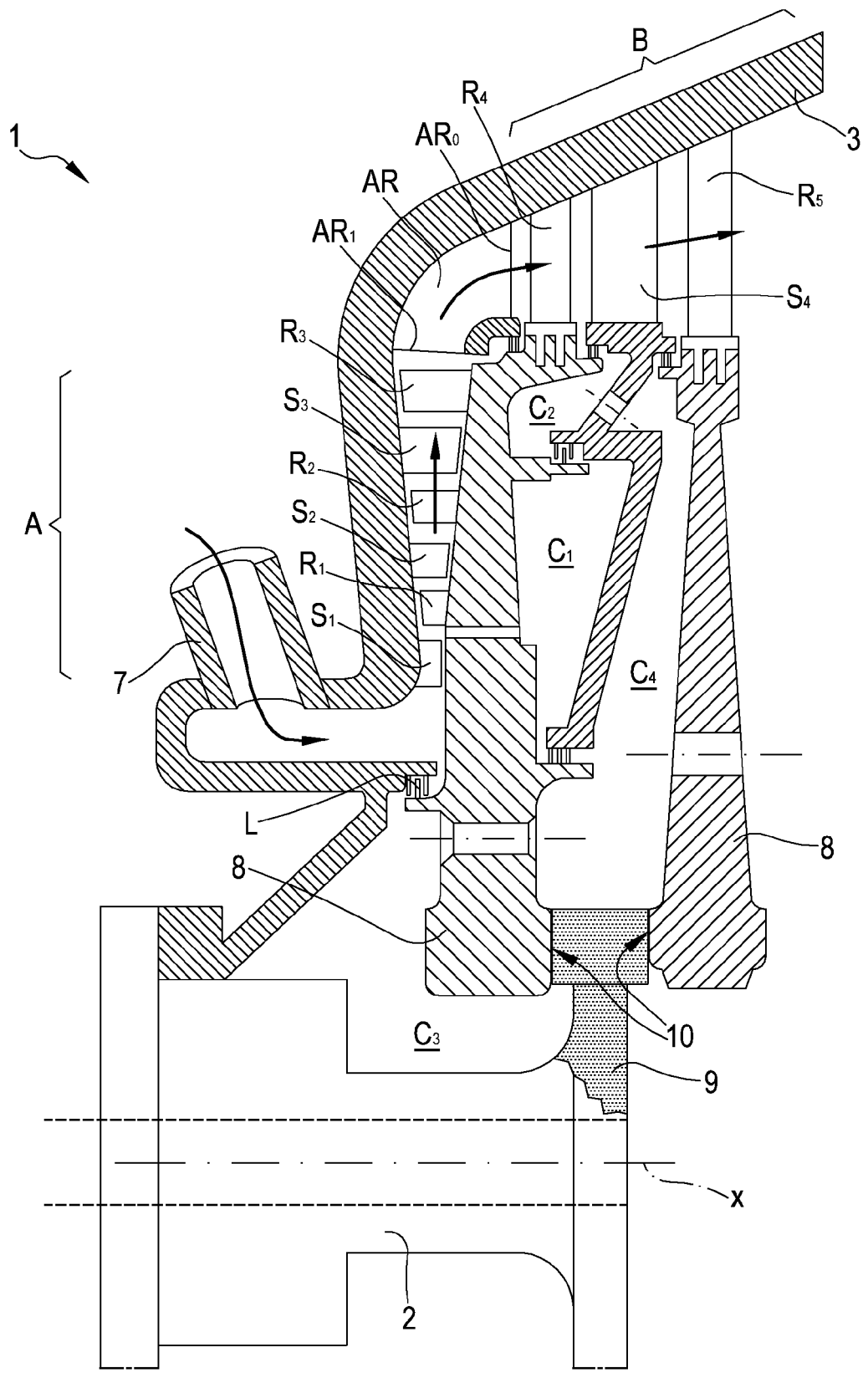
FIG. 1 is a partial section view of a first embodiment of the turbine according to the present invention.

FIG. 1 is a partial view, in an axially symmetrical section, of a turbine 1 according to the present invention for the expansion of an organic operating fluid.

Preferably the operating fluid belongs to hydrocarbon class, more preferably to cyclic hydrocarbons. For example, the operating fluid is cyclopentane.

The turbine comprises a shaft 2 extending in the axial direction X, an outer case 3, or volute, and a plurality of arrays of stator blades $S_1$-$S_n$ and rotor blades $R_1$-$R_n$ alternated one another, that is according to the scheme $S_1$-$R_1$; $S_2$-$R_2$; $S_n$-$R_n$, etc.

In particular the turbine 1 is conceptually divided in a first section A and in a subsequent section B according to the expansion direction of the operating fluid vapor. In the first section A, named high-pressure section, a first expansion of the operating fluid is provided in a substantially radial direction, that is orthogonal to the X axis; in the second section B, named low-pressure section, a second expansion of the operating fluid is provided in a substantially axial direction, that is parallel to X axis.

Between the two A and B sections of the turbine at least one array of angular stator blades AR is provided, which have the function of diverting the operating fluid flow from the initial radial direction of expansion to the axial, or even tangential, direction (direction orthogonal to the paper sheet while observing FIG. 1).

In particular the turbine 1 shown in FIG. 1 comprises three stages radially arranged $S_1$-$R_1$; $S_2$-$R_2$; $S_3$-$R_3$ upstream the array of angular blades AR and one or more stages axially disposed $R_4$-$S_4$; $R_5$-$S_5$ (not shown), downstream the array of angular blades AR. Generally the number of stages upstream and downstream the angular blades AR can be different.

The angular stator blades AR are constrained to the volute 3 and, as shown in figure, they extend according to a curved path (seen in axial section). The leading edge $AR_i$ of the blades AR extends preferably in the axial direction and the trailing edge $AR_o$ extends preferably in the radial direction; therefore each blade AR extends along a curved path with such a course of the fluid dynamic duct to decrease or eliminate (with respect to values upstream of the blades themselves) the average radial component of the operating fluid flow and to generate the axial and tangential components.

Preferably the stator blades AR extend, when observed by an observer placed on the rotation axis X, with a first substantially radial length between a base and a peripheral portion next which the blades curve circumferentially or tangentially, and after they have an inter-blade duct that is gradually diverted in the axial and tangential direction.

Some rotor blades $R_n$ and preferably all of them, are supported by supporting disks 8 constrained to the shaft 2 of the turbine 1 by means of a Hirth toothing identified by numeral reference 10 (in partial section). In particular, the supporting disks 8 are coupled to a flange 9 of the shaft, as shown in figure. The Hirth toothing allows the disks 8 to "float" in the radial direction, self-centering with respect to X axis.

Steel stay rods (not shown) push the supporting disks 8 axially against the corresponding coupling flange of the shaft 2.

The shaft 2 is supported by bearings (shown along with a fluidic sealing) at the respective ends, or else it is preferably cantileverly supported, with the bearings arranged at the same side of the supporting disks 8.

The volute 3 is provided with one or more inflow manifolds 7 of the operating fluid vapor to be expanded.

The path the vapor made during the relative expansion is shown by the arrows.

Figure 2:
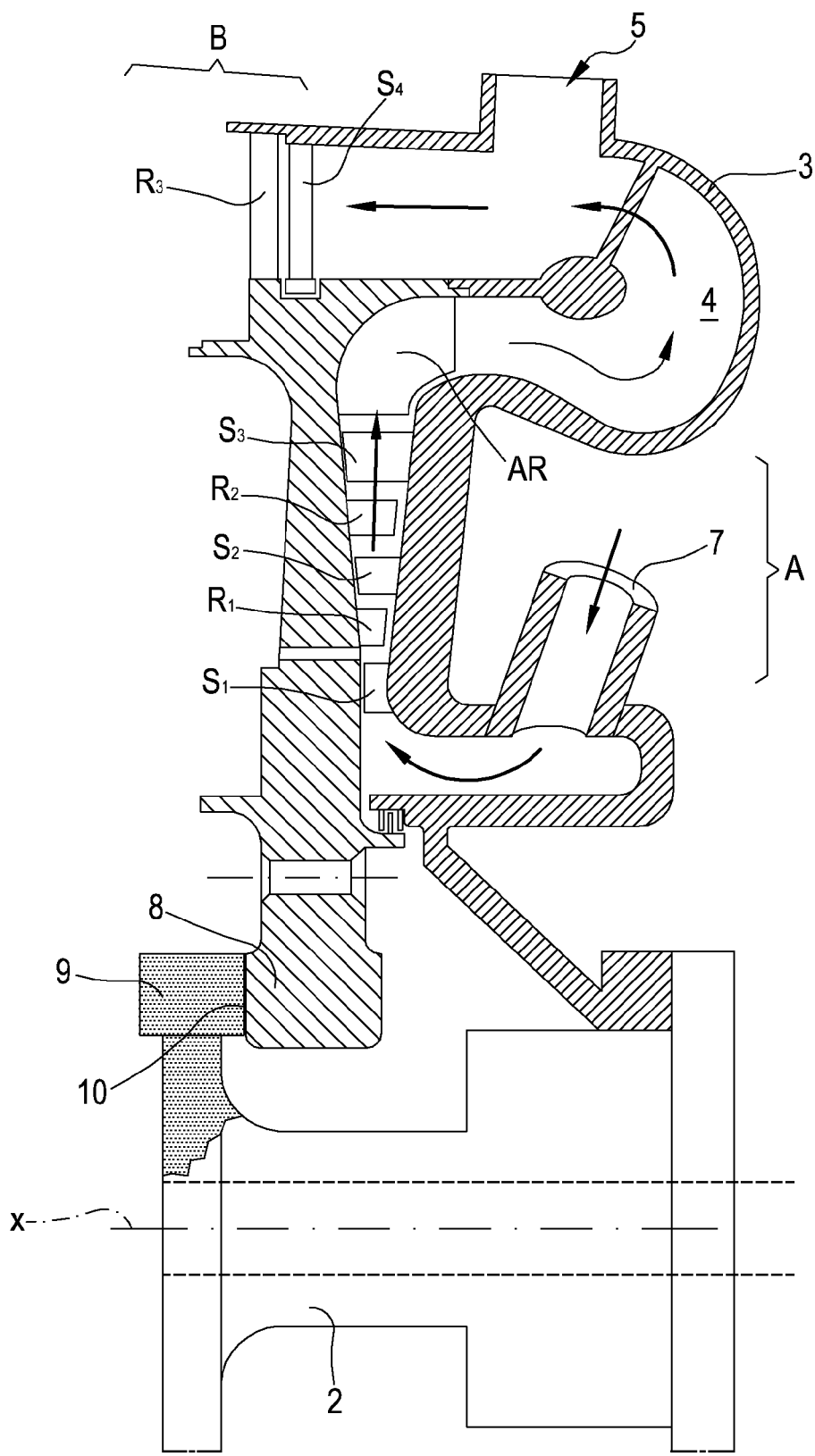
FIG. 2 is a partial section view of a second embodiment of the turbine according to the present invention.

FIG. 2 shows an alternative embodiment of the turbine 1, in which the angular blades AR are rotor blades, supported by a disk 8. Reference numerals equal to those indicated in FIG. 1 identify identical or equivalent elements.

Differently from the preceding solution, the vapor flow of the operating fluid is diverted from the array of angular blades AR in the axial direction, but counterflow with respect to the axial extension of the turbine 1, that is diverted towards the part where the fluid intake in turbine 1 is provided. For this reason the volute 3 defines a toroidal duct 4 that curves like a U to invert the feeding flow direction, so that to direct the flow towards the low-pressure stages B.

Preferably, downstream the array of rotor angular blades AR, the section of the duct 4 increases to cause the flow slowdown before the inversion of its feeding direction. Between the blade array AR and the low-pressure section B, one or more inflow or extraction ports 5 can be present.

Also in this second embodiment the angular blades AR increase preferably the tangential component of speed vector of the vapor flow with respect to the value downstream the angular blades AR themselves.

Figure 3:
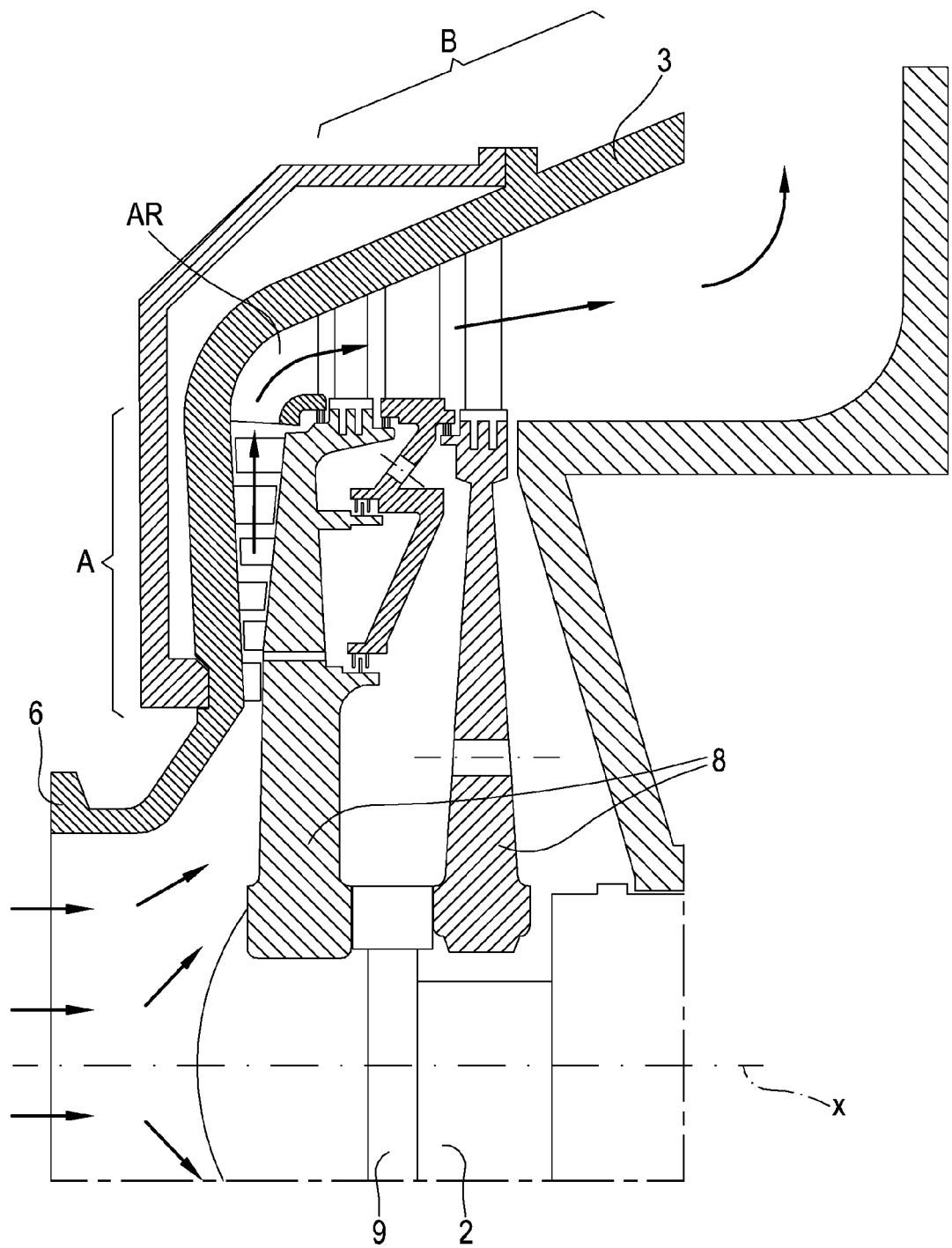
FIG. 3 is a partial section view of a third embodiment of the turbine according to the present invention.

FIG. 3 shows a third embodiment of the turbine 1. The angular blades AR are stator blades and they are supported by the volute 3. Differently from the first embodiment, the shaft 3 is cantileverly supported on corresponding bearings provided in the same side of the volute 3, and in particular at the same side of the exhaust volute of the volute 3.

In this embodiment the inflow of the vapor to be expanded is realized directly in the front direction, as shown in figure, by means of an axial manifold 6 assembled aligned and coaxial with respect to the shaft 2. Also in the first embodiment with the shaft 2 cantileverly assembled, the axial manifold 6 can be adopted.

Also in the second and third embodiment the number of stator and rotor stages can be different from what shown in figures.

Referring to FIGS. 1-3, the turbine 1 comprises the chambers C1, C2, C3, C4, each delimiting a volume inside the turbine characterized by a relative pressure value. Chambers C1, C2, C3, C4 are arranged to obtain a compensation of axial thrusts acting on supporting disks 8 by virtue of pressure differences between the different sections A-B of the turbine 1.

Particularly referring to FIG. 1, labyrinth L keeps chamber C3 substantially separated from high-pressure section A. To avoid the pressure of operating fluid passing through the high-pressure section from pushing the first supporting disk 8 towards the chamber C1 (rightwards viewing FIG. 1), the latter is communicating with high-pressure section A by means of one or more through holes which open between the arrays $S_1$ e $R_1$ crossing the first disk 8, or else in other position in the section A itself.

Similarly, chambers C2 and C4 are communicating one to another and to the exhaust section of the turbine through a duct extending through the second supporting disk 8; between the chamber C1 and C2 a separating labyrinth is provided.

With the described arrangement, the pressure of chamber C1 is equal or near to the fluid pressure in the selected point of high-pressure section A and the pressure in chambers C2, C3 and C4 is equalized to the exhaust pressure of turbine 1.

The turbine 1 shown in any one of FIG. 1-3 allows to carry out the method according to the present invention, as described above.

Advantageously the turbine 1 allows to obtain a high enthalpy change and a high expansion ratio in a Rankine cycle with organic fluid.

The invention claimed is:

1. A method for expanding an organic operating fluid in a Rankine cycle, comprising:
    feeding the organic operating fluid to a turbine provided with a plurality of stages, each defined by an array of stator blades alternating with an array of rotor blades constrained to a shaft which rotates on a respective rotation axis, and further comprising the following steps:
    a) causing a first expansion of the organic operating fluid through one or more radial stages, and
    b) diverting the organic operating fluid in a blade array, named angular blades, from a substantially radial expansion direction to an expansion direction substantially axial and tangential with respect to an observer integral with said angular blades, and
    c) inducing a second fluid expansion of the organic operating fluid through one or more axial stages,
    wherein said step b) corresponds to an enthalpy change of the organic operating fluid equal to at least 50% of the average enthalpy change provided for completing the fluid expansion in the turbine.

2. The method according to claim 1, wherein the step a) is carried out by leading the organic operating fluid through at least one array of stator blades and a corresponding array of rotor blades disposed alternated one another in a radial direction, the step c) is carried out by leading the organic operating fluid through at least one array of stator blades and a corresponding array of rotor blades disposed alternated one another in an axial direction, and the step b) is carried out by leading the organic operating fluid through an array of stator or rotor angular blades.

3. The method according to claim 1, wherein the angular blades are rotor blades and wherein between steps b) and c) the following step is carried out:
    d) inverting a way of fluid expansion direction downstream of the array of angular blades.

4. The method according to claim 1, wherein at least 10% of an enthalpy change caused by the expansion of the operating fluid in said step b) is transformed to kinetic energy of the organic operating fluid exiting from the array of angular blades.

5. A turbine for an expansion of an organic operating fluid of a Rankine cycle, comprising arrays of stator blades and arrays of rotor blades, alternated to the former, and a shaft for supporting the rotor blades which is rotating on a respective rotation axis, wherein in a first section of the turbine the arrays of stator blades and the arrays of rotor blades alternate in a substantially radial direction, in a second section of the turbine the arrays of stator blades and the arrays of rotor blades alternate in a substantially axial direction, and between the first and the second sections of the turbine there is at least one array of stator or rotor blades, named angular blades, arranged to divert the organic operating fluid from a substantially radial expansion direction to a substantially axial and/or tangential expansion direction, wherein an enthalpy change of the organic operating fluid expanded through the angular blades is equal to at least 50% of an average enthalpy change provided for completing the expansion of the organic operating fluid in the turbine.

6. The turbine according to claim 5, wherein a leading edge of the angular blades extends in a substantially axial direction and a respective trailing edge extends in a substantially radial direction.

7. The turbine according to claim 5, wherein the angular blades extend in a substantially curved radial and axial direction.

8. The turbine according to claim 5, wherein said angular blades extend at least partially in a tangential direction to increase a tangential component of a fluid speed vector at least in a relative motion observed by an observer integral with the angular blades.

9. The turbine according to claim 5, further comprising an axial intake manifold of the organic operating fluid arranged aligned with the shaft, and wherein said shaft is cantileverly supported by bearings provided from an opposite side with respect to said intake manifold and wherein said angular blades are stator or rotor blades.

10. The turbine according to claim 5, further comprising a volute, wherein said angular blades are rotor blades and between them and the array of immediately downstream stator blades, the volute defines a curve of about 180° in which the axial direction of fluid expansion is inverted.

11. The turbine according to claim 10, wherein a passage section between the angular blades and said curve is at least partially increasing to obtain a slowdown of the organic operating fluid before the respective expansion direction is inverted.

12. The turbine according to claim 10, wherein downstream of said curve the volute is provided with at least one inflow/extraction port of the organic operating fluid.

13. The turbine according to claim 10, further comprising an intake manifold of the organic operating fluid radially arranged with respect to the shaft, in a substantially intermediate position between respective supporting bearings.

14. The turbine according to claim 5, wherein at least one array of rotor blades is assembled on supporting disks coupled to corresponding flanges of the shaft with a Hirth toothing.

15. The turbine according to claim 14, wherein upstream and downstream of a first supporting disk, with respect to the rotation axis, at least one chamber is provided and defined by a corresponding inner volume of the turbine, and wherein chambers, which are arranged on a same side of the first supporting disk are substantially isolated one from another, and wherein the first supporting disk is provided with at least one through hole for equalizing a pressure inside two chambers, which are separated by the first supporting disk itself, or for equalizing a pressure of a chamber downstream of the first supporting disk with a pressure inside the first section of the turbine.

16. The turbine according to claim 15, further comprising a second supporting disk, wherein the second supporting disk is placed downstream of the first supporting disk and it is provided with at least one through hole for equalizing a pressure inside the chamber immediately upstream of the second disk itself with exhaust pressure of the turbine.

* * * * *